Figure 1:
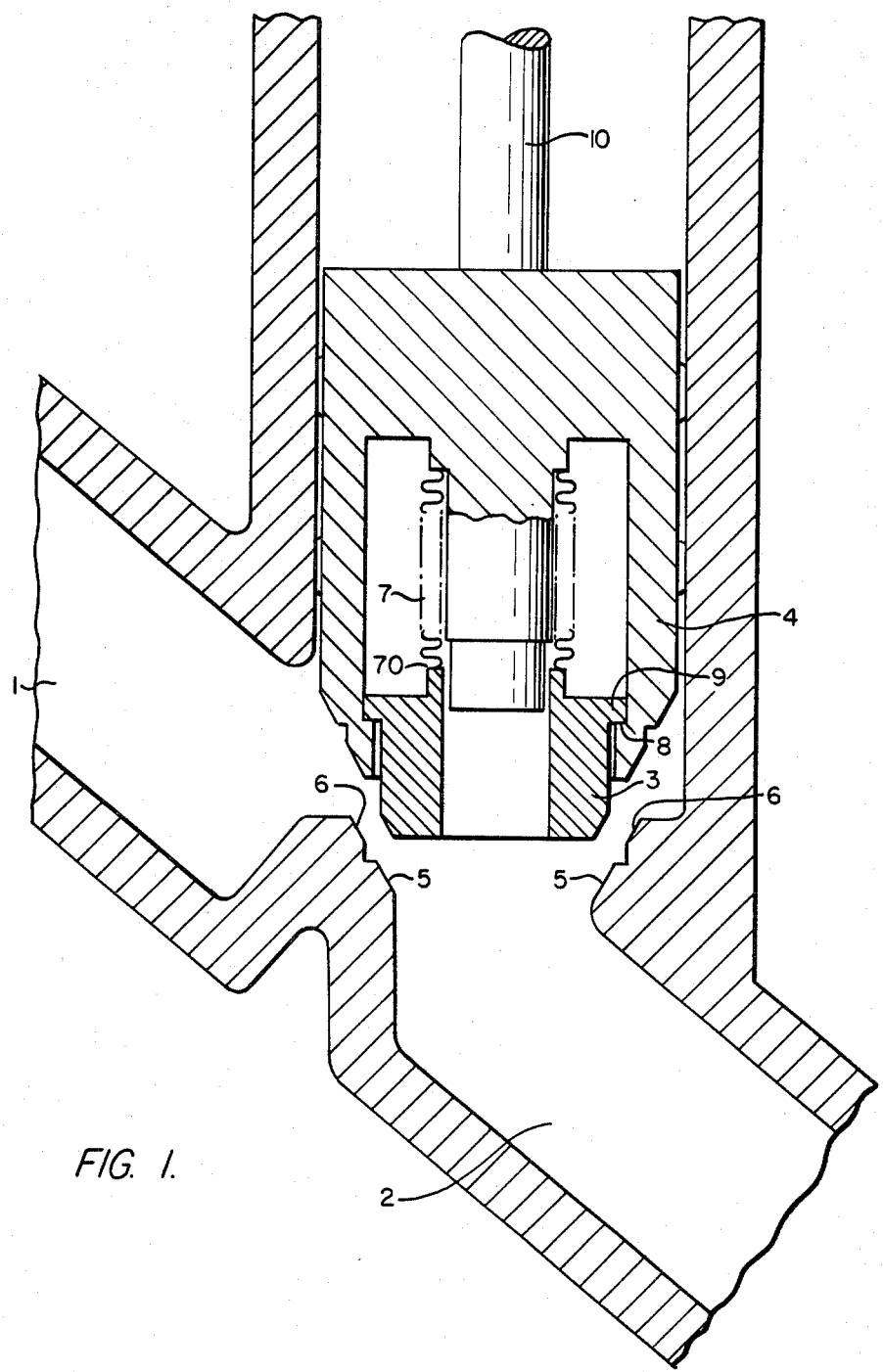

United States Patent [19]

Timmermans

[11] Patent Number: 4,529,168
[45] Date of Patent: Jul. 16, 1985

[54] DOUBLE SHUT-OFF VALVE WHICH PROVIDES PERFECTLY TIGHT SEALING

[75] Inventor: Francis Timmermans, Jeumont, France

[73] Assignee: Jeumont-Schneider Corporation, Puteaux, France

[21] Appl. No.: 461,541

[22] Filed: Jan. 27, 1983

[30] Foreign Application Priority Data

Feb. 1, 1982 [FR] France .................... 82 01534

[51] Int. Cl.³ .............................................. F16K 1/00
[52] U.S. Cl. ................................................... 251/210
[58] Field of Search ........................................ 251/210

[56] References Cited

U.S. PATENT DOCUMENTS 1,724,017  8/1929  Godfrey .
4,166,607  9/1979  Webb ................................. 251/335
4,232,695  11/1980  Roberge ............................ 137/1

*Primary Examiner*—Carroll B. Dority, Jr.
*Attorney, Agent, or Firm*—Rines and Rines

[57] ABSTRACT

The present invention pertains to a double shut-off valve device which is specifically intended to eliminate the consequences of erosion and the resulting lack of perfectly tight sealing.

This device consists of two concentric valve components, namely an inner component, (3), and an outer component, (4), which, in a closed position, respectively rest upon seats, (5) and (6), so as to halt the flow of fluid between sections of a pipe, (1) and (2). Functioning of these components is controlled by a rod (10) which is directly connected to the outer valve component (4), and by a flexible bellows (7) attached to the inner valve component (3). Under these circumstances, the inner valve component (3) halts the flow of fluid, and the outer valve component (4), which is not subject to fluid pressure, can provide tight sealing without erosion. Opening of both valve components occurs simultaneously on account of the accompanying shoulders, (8) and (9).

1 Claim, 2 Drawing Figures

DOUBLE SHUT-OFF VALVE WHICH PROVIDES PERFECTLY TIGHT SEALING

The present invention relates to double shut-off valves for providing tight sealing.

Insufficiently tight sealing in a closed position is a significant difficulty with respect to valves, particularly in situations where it is necessary to regulate a substantial flow under high pressure.

Deterioration of shut-off components and seats, which causes leakage, is attributable to the following circumstances: wear on account of erosion, and deformation as a result of excessive force transmitted by control mechanisms.

The valve to which the present invention pertains consists of two concentric components, with each of these valve components possessing the general form of a shut-off piston, whereby the periphery of the head is in the form of a spherical cap, in order that these components may respectively rest upon seats possessing a corresponding shape. The aforementioned seats are positioned in such a manner that the inner valve component, as a result of the closing procedure, can rest upon its seat before the outer valve component approaches its respective seat. In this instance, shutting of the inner valve component occurs before shutting of the outer valve component.

The latter component, which must ultimately ensure tight sealing when the valve is closed, is not subject to stress applied in order to overcome fluid pressure, nor is it affected by deformation resulting from stress applied on account of said pressure. In addition, only the inner valve component and its seat can be affected by erosion resulting from closing under pressure. Consequently, the outer valve component and its seat are protected from any form of erosion, and there is perfectly tight sealing at all times. An application of the present invention shall be described hereinafter, in reference to the accompanying illustrations, as a non-restrictive example of said invention.

FIG. 1 represents the valve components in an open position, and

Figure 2:
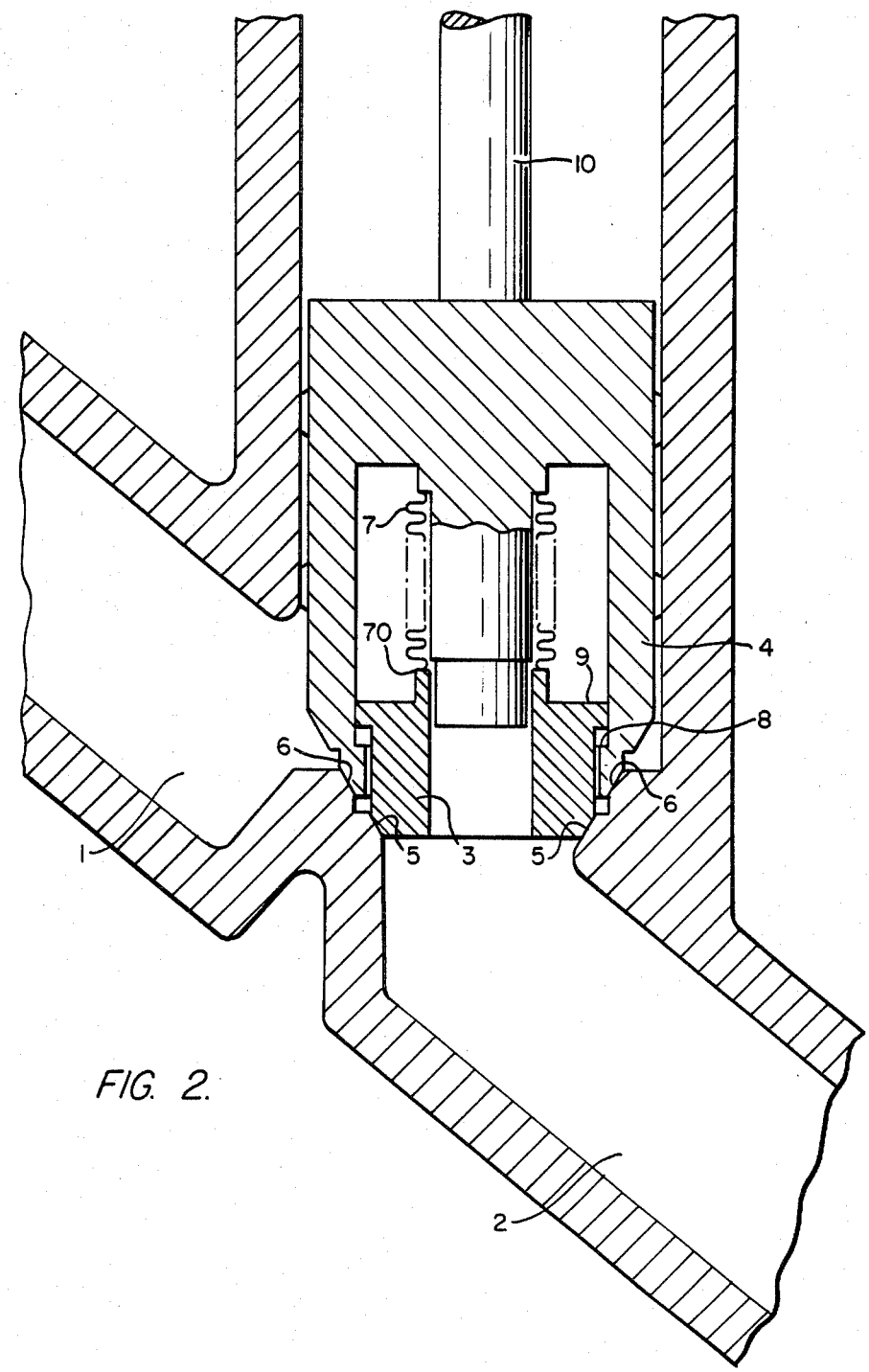

FIG. 2 represents said valve components in a closed position. Within these illustrations, the reference numerals (1) and (2) respectively correspond to the path of the fluid, above and below the valve. Reference numeral (10) identifies the control rod for the inner valve (3) and the outer valve (4). Reference numeral (5) corresponds to the seat for the inner valve (3), while reference numeral (6) corresponds to the outer valve (4). The inner valve (3) closes by means of a flexible bellows (7), which rests upon a shoulder (70). Reference numeral (8) identifies an inner shoulder for the outer valve (4), and reference numeral (9) identifies an outer shoulder for the inner valve (3).

The manner in which this device operates shall be described hereinafter. Initially, it is to be assumed that the valve components are in an open position, as shown within FIG. 1, with the fluid flowing freely from (1) to (2).

When the shut-off mechanism (10) is employed, both valve components are pushed downward.

On account of the manner in which positions for the seats have been provided, the inner valve (3) is the first to rest upon its respective seat (5), thereby halting the flow of fluid. During its downward course, this valve component is pushed toward its seat by means of strong differential pressure.

As the closing procedure continues, the flexible bellows (7) is squeezed, and the valve component identified as (4) ultimately rests upon its respective seat (6). FIG. 2 shows the valve components in this position.

Inasmuch as the inner valve component (3) has halted the flow, the outer valve component (4) is not exposed to the movement of the fluid, and it can therefore close with a low differential pressure and a low flow rate. This component can permit perfectly tight sealing to be maintained at all times, inasmuch as it is not affected by erosion nor by deformation which may be caused by the considerable force required to overcome fluid pressure. The inner valve component is the only one which may be affected by possible erosion, although proper functioning of the device is not hindered, because this component is not intended to provide perfectly tight sealing in a closed position. As has been indicated heretofore, that function is performed by the outer valve component (4).

The valve is opened by means of the following procedure: the control rod (10) is pulled upward, thereby causing the outer valve component (4) to move in an identical manner, inasmuch as this component is directly attached to the control rod, without any flexible form of connection. As this component continues to move, the inner valve component (3) is likewise drawn upward, on account of the presence of the shoulders, (8) and (9), and both valve components return to the position shown in FIG. 1.

The preceding description clearly demonstrates that a double shut-off valve consisting of the components indicated therein can provide the advantages which have been cited heretofore.

It is obvious that the present invention is not restricted to the version which has been described as an indicative example thereof, and that any modifications which may be introduced in terms of form, number, and dimensions of the respective components would not represent a departure from the concept embodied by this invention.

I claim:

1. A double shut-off valve device for providing perfectly tight sealing between an upstream high pressure region and a downstream low pressure region of a pipe, comprising, in combination, inner and outer coaxial valve components having associated coaxial valve seats adapted to be engaged by said components, and, when so engaged, segregating said high pressure region from said low pressure region, said outer valve component being hollow and having said inner valve component movably supported therein by means of a bellows coaxial with said valve components, said inner valve component projecting from said outer valve component whereby said inner valve component engages its seat before said outer valve component engages its seat, said inner valve component having a central passage therethrough providing communication between the interior of said bellows and said low pressure region when said inner valve component engages its seat, and control means for moving said valve components into and out of engagement with their seats, said outer valve component having a central shaft portion extending into the passage of said inner valve component and said bellows being disposed about said shaft portion and having outer cross-dimensions substantially smaller than corresponding cross-dimensions of the inner valve component.

* * * * *